United States Patent [19]

Roemer et al.

[11] Patent Number: 5,584,226
[45] Date of Patent: Dec. 17, 1996

[54] HYDRAULICALLY SUPPORTED POWER STEERING SYSTEM

[75] Inventors: Matthias Roemer, Weinstadt; Hans Scheerer, Esslingen, both of Germany

[73] Assignee: Mercedes-Benz AG, Stuttgart, Germany

[21] Appl. No.: 272,540

[22] Filed: Jul. 11, 1994

[30] Foreign Application Priority Data

Jul. 10, 1993 [DE] Germany ............. 43 23 179.9

[51] Int. Cl.⁶ ............................. F15B 11/042
[52] U.S. Cl. .................. 91/447; 60/469; 137/493.8
[58] Field of Search ............. 91/29, 31, 375 R, 91/447, 452; 60/469; 137/493.8, 516.17, 516.23

[56] References Cited

U.S. PATENT DOCUMENTS

| | | | |
|---|---|---|---|
| 2,685,888 | 8/1954 | Strauss | 137/493.8 |
| 3,592,223 | 7/1971 | Reese | 137/493.8 |
| 3,706,362 | 12/1972 | Faure | 137/493.8 |
| 4,820,136 | 4/1989 | Saurwein | 91/447 |

FOREIGN PATENT DOCUMENTS

| | | |
|---|---|---|
| 0050446 | 4/1982 | European Pat. Off. |
| 0481469A2 | 4/1992 | European Pat. Off. |
| 2927039 | 1/1981 | Germany. |
| 4029156 | 4/1991 | Germany. |
| 4106310 | 8/1991 | Germany. |
| 2051714 | 1/1981 | United Kingdom. |

OTHER PUBLICATIONS

Reimpell, J.: Fahrwerktechnik: Lenkung, Vogel–Buchverlag Wurzburg, 1st Edition 1984, pp. 119–127.

Primary Examiner—F. Daniel Lopez
Attorney, Agent, or Firm—Evenson, McKeown, Edwards & Lenahan, P.L.L.C.

[57] ABSTRACT

A hydraulically supported power steering system is disclosed for motor vehicles including a double-acting hydraulic displacement unit or piston/cylinder unit for generating an auxiliary hydraulic force. For this purpose, the displacement body working spaces or piston working spaces can be acted upon by controllable hydraulic pressure or relieved of hydraulic pressure by means of associated conduits controlled by a servo-valve. The displacement unit or piston/cylinder unit also undertakes the function of a steering damper by means of damper valves arranged on the conduit connections. The damper valves include a perforated disc type of support part which can be clamped in the manner of a spacer ring between a bearing surface of a connecting mouthpiece arranged on a housing of one of the servo-valve and the displacement unit and an opposite bearing surface of a connecting part of a conduit, said connecting part being detachably connected to the connecting mouthpiece.

18 Claims, 4 Drawing Sheets

HYDRAULICALLY SUPPORTED POWER STEERING SYSTEM

BACKGROUND AND SUMMARY OF THE INVENTION

The invention relates to a hydraulically supported power steering system, in particular for motor vehicles. A double-acting hydraulic displacement unit is provided for generating an auxiliary hydraulic force. Controllable hydraulic pressure is supplied to and relieved from displacement body working spaces by means of associated conduits controlled by a servo-valve. Damper valves are arranged on the conduit connections.

In order to restrict the actuation forces which have to be applied by the driver of a motor vehicle when actuating the vehicle steering, heavy vehicles are regularly equipped with a power steering system which, at least in the case of passenger cars, typically operates by means of auxiliary hydraulic force which is generally generated by means of a displacement unit configured as a piston/cylinder unit.

In addition, vehicle steering systems regularly have a separate steering damper which suppresses vibrations excited in the steering system as required.

In this connection, it is basically known from German Patent Document DOS 40 29 156 to allow the double-acting piston/cylinder unit used for generating the auxiliary hydraulic force to act also as the steering damper by arranging damper elements in the conduits between the servo-valve and this unit. These damper elements, however, have a relatively complicated construction.

A similar arrangement is the subject matter of German Patent Document DOS 41 06 310.

It is known from German Patent Document DOS 29 27 039 to arrange a non-return valve, provided with a throttling passage hole and opening towards the respective piston working space, on the cylinder-end connection of each of the conduits which connect the servo-valve to the double-acting piston/cylinder unit of a power steering system. The valve housing of the non-return valve can be formed by a bolt which is used for fixing the respective conduit to the cylinder.

These known constructions have not been generally applied in practice, although it is fundamentally advantageous to obviate a separate steering damper and to integrate its function in the power steering system.

In practice, therefore, separate steering dampers are inserted, such as are described, for example, in the publication REIMPELL, J.: Fahrwerktechnik: Lenkung, VOGEL-BUCHVERLAG WURZBURG, 1st Edition 1984, Pages 119 to 127. In these, the pistons of the steering system dampers typically have axial passages which are controlled by plate valves arranged on the piston.

An object of the invention is to improve the construction of a power steering system of the type referred to above and to permit good matching of the damper forces.

This object is achieved according to the invention in that the damper valves have a perforated disc type of support part which can be clamped in the manner of a spacing ring or washer between a bearing surface of a connecting mouthpiece arranged on the housing of the servo-valve or of the displacement unit and an opposite bearing surface of a connecting part of the conduit, which connecting part can be connected to the connecting mouthpiece.

In preferred embodiments of the invention, provision is particularly made for the support part to have a disc-type piston with axial passages controlled by the damper valves and this piston divides two chambers from one another within a space enclosed by the connecting mouthpiece and the connecting part, of which chambers one is connected to the respective conduit and one is connected to the servo-valve or a working chamber of the displacement unit or piston/cylinder unit.

In the invention, the assembly requirements are, on the one hand, kept very small because the arrangement of the damper valves is undertaken in the simplest manner during the assembly of the connecting conduits between the servo-valve and the displacement unit or piston/cylinder unit.

On the other hand, the arrangement of the damper valves on a disc-shaped piston achieves the effect that elements known from the manufacture of steering dampers can, fundamentally, be employed unaltered.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 1:
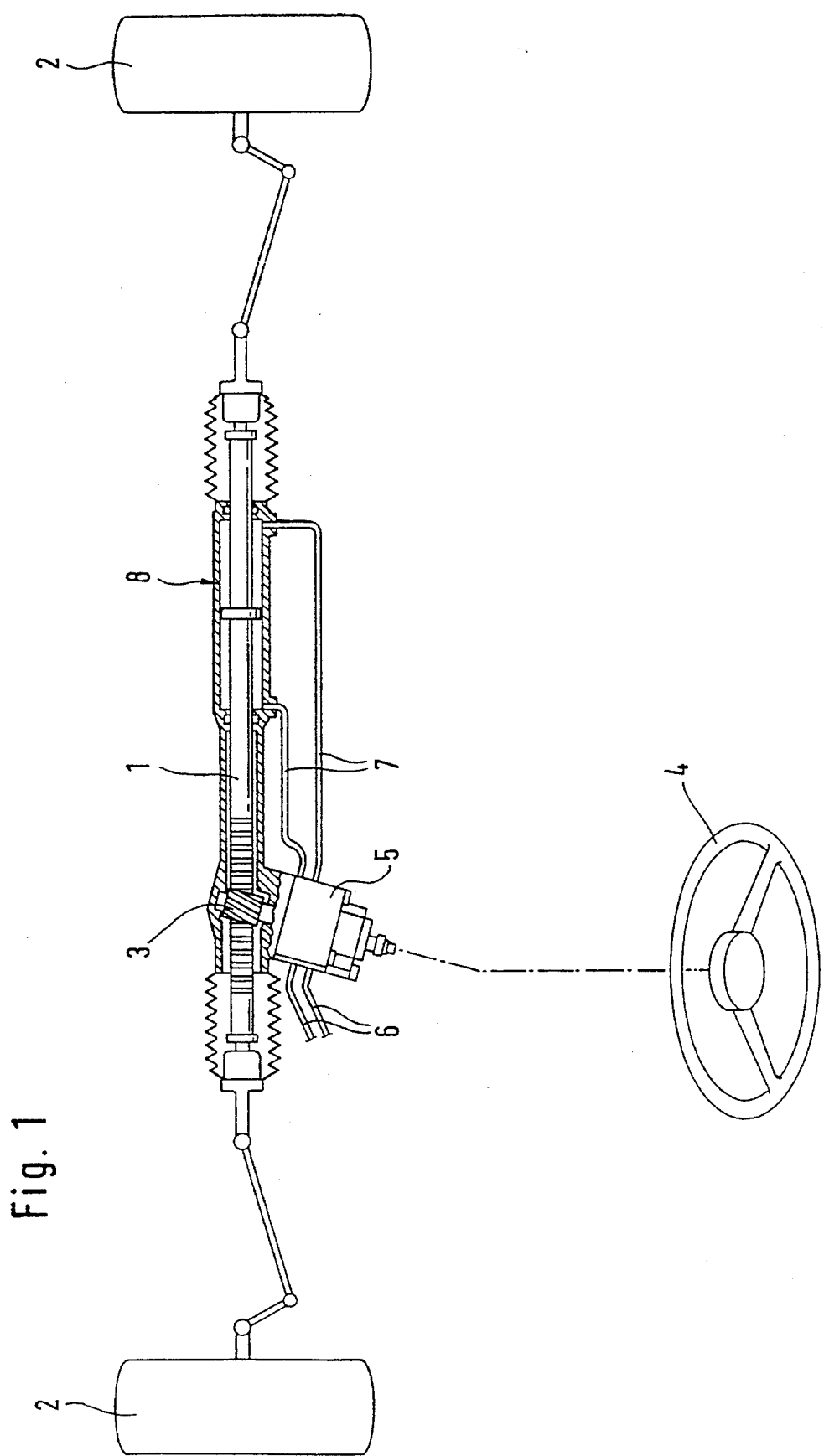
FIG. 1 shows a diagrammatic overall view of a power steering system according to the present invention.

In FIG. 1, a rack 1 which is connected in a known manner by means of a steering linkage to the steered wheels 2 of a motor vehicle (not shown otherwise) is driven by a pinion 3 which is in turn drive-connected to the steering wheel 4 of the motor vehicle. The drive transmission between the steering wheel 4 and the pinion 3 actuates a hydraulic servo-valve 5 as a function of the direction and magnitude of the torque transmitted between the steering wheel 4 and the pinion 3. The servo-valve 5 is connected, on the one hand, via conduits 6 to a pressurized oil source (not shown) and to an unpressurized oil reservoir (likewise not shown) and, on the other hand, via conduits 7 to the working chambers of a double-acting piston/cylinder unit 8 whose piston rod is firmly or integrally connected to the rack 1.

A pressure difference which depends on the torque transmitted between the steering wheel 4 and the pinion 3 is generated in the two chambers of the piston/cylinder unit 8 by means of the servo-valve 5 in such a way that the steering forces applied by the driver at the steering wheel 4 are kept small because of the auxiliary hydraulic force effected by the pressure difference.

The piston/cylinder unit 8 also undertakes the function of a steering damper. For this purpose, damper valves are provided on the cylinder-end connections of the conduits 7—or on the connections joining these conduits 7 to the servo-valve 5—the arrangement and construction of these damper valves being explained below with reference to FIGS. 2 to 7.

Figure 2:
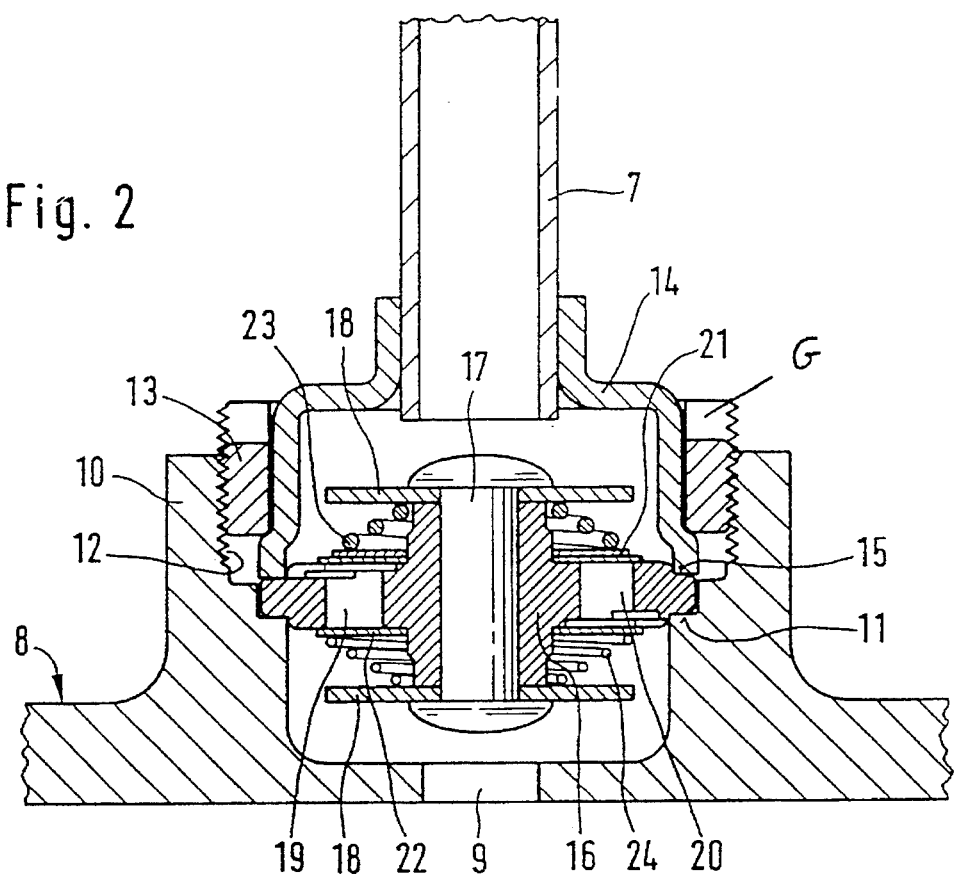
FIGS. 2 to 7 are respective sectional views of various preferred embodiments of the damper valves according to the present invention.

In FIG. 2, a tubular connecting mouthpiece 10 is arranged on the cylinder of the piston/cylinder unit 8 at an opening 9 leading to a piston working space. This connecting mouthpiece 10 widens towards the top in FIG. 2 to form an annular step with an annular bearing surface 11 and has an internal thread 12 above the annular step. An externally threaded ring 13 can be screwed into the thread 12 and is provided with radial grooves G on its upper end surface in FIG. 2 to permit a tool to be placed there to adjust the threaded ring 13 by screwing it in or out.

The threaded ring 13 engages a cup-shaped or bell-shaped connecting part 14 which is configured as a drawn sheet-metal part and which is connected to one of the conduits 7, by brazing for example. At its bottom rim (in FIG. 2), the connecting part 14 has a rim which is beaded or widened in the form of a ring step whose outer diameter is greater than the inner diameter of the threaded ring 13. In consequence, the connecting part 14 is displaced in the direction of the bearing surface 11 when the threaded ring 13 is screwed into the internal thread 12 of the connecting mouthpiece 10.

The rim region, facing towards the bearing surface 11, of the connecting part 14 forms an opposite bearing surface 15 in such a way that when the threaded ring 13 is screwed into the internal thread 12, the rim region of a disc-shaped piston 16, which has previously been placed into the connecting mouthpiece 10, can be tightly clamped between the bearing surface 11 and the opposite bearing surface 15.

The piston 16 has a central hole and axial extensions on its top and bottom, which axial extensions are penetrated by this central hole. The central hole accommodates a rivet pin 17 by means of which annular abutment discs 18 arranged on the free ends of the axial extensions of the piston 16 are held.

Furthermore, the piston 16 has axial holes 19 and 20 arranged in a ring about its axis, the axial holes 19 in FIG. 2 widening in step shape towards the top whereas the axial holes 20 widen correspondingly at their lower ends.

Annular valve plates 21 and 22 are respectively located on the upper and lower openings of the axial holes 19 and 20 and these valve plates 21 and 22 are loaded by means of conical spiral springs 23 and 24, respectively, against the respective openings of the axial holes 19 and 20. The conical spiral springs 23 and 24 are therefore loaded in compression between the abutment discs 18 and the respective valve plates 21 and 22. The valve plate 21 can completely cover the upper openings of the axial holes 20 and can only partially cover the openings, widened at the top, of the axial holes 19; in a corresponding manner, it is only the lower openings of the axial holes 19 which can be completely covered by the valve plate 22.

Given an appropriate pressure drop, therefore, hydraulic medium from the conduit 7 can enter the axial holes 19 past the valve plate 21 and flow to the opening 9 and, by this means, into one piston working chamber of the piston/cylinder unit 8, the valve plate 22 being raised from the closed position shown against the force of the relatively weak spring 24. The flow mentioned must overcome a certain throttling resistance which is caused, on the one hand, by the constriction of the upper openings of the axial holes 19 caused by the upper valve plate 21 and, on the other hand, by the closing pressure of the valve plate 22.

In the case of a pressure drop in the reverse direction, the hydraulic medium flows past the valve plate 22, which is in the closed position, into the axial holes 20 and then, opening the valve plate 21, reaches the conduit 7. In this case, it is necessary to overcome the relatively large closing pressure which is exerted by the spring 23 loading the valve plate 21.

In this way, different throttling resistances can be generated depending on the flow direction. These throttling resistances act so as to damp vibrations of the piston of the piston/cylinder unit 8 and of the vehicle steering system drive-connected to it.

Because an arrangement corresponding to FIG. 1 is regularly also associated with the respectively other piston working chamber of the piston/cylinder unit 8, the damping effect is the same in both directions of motion of the piston of the piston/cylinder unit 8.

Figure 3:
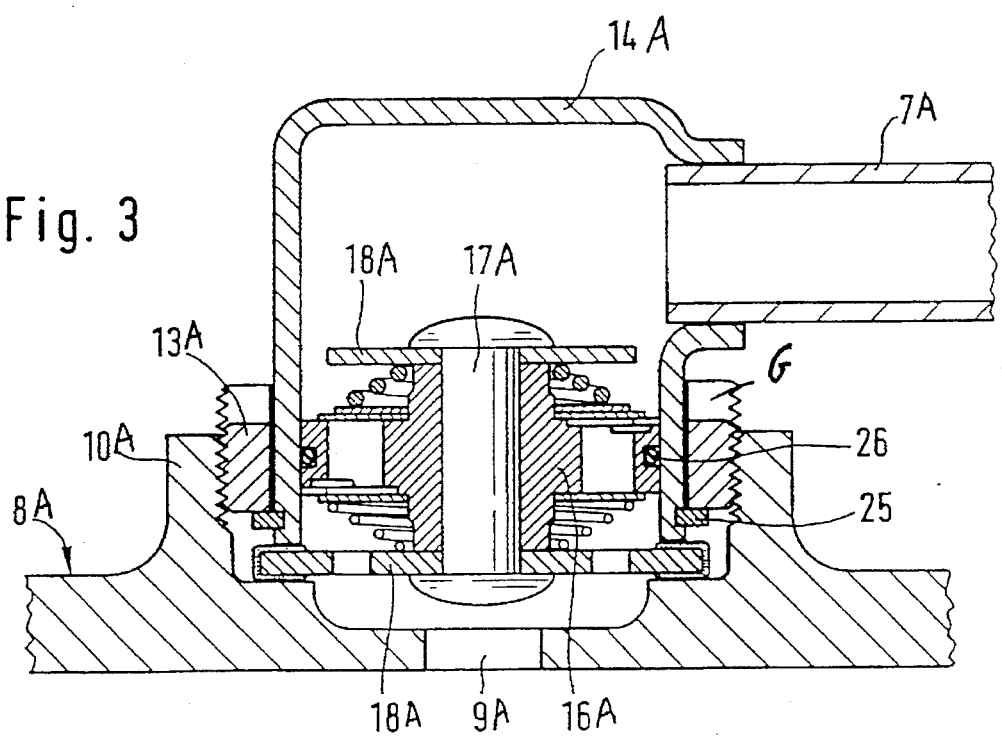

In FIG. 3, corresponding drawing reference numbers (with suffix "A") as used in FIG. 2 are used for similarly operating parts. Unless otherwise described below, the description of these parts for FIG. 2 can be assumed.

From FIG. 3, it may first be seen that instead of a widened rim region below the threaded ring 13A on the connecting part 14A, it is also possible to arrange a spring ring 25 held in an annular groove, the threaded ring 13A interacting with the spring ring 25 when the connecting part 14A is advanced towards the bearing surface 11A.

Furthermore, the conduit 7A can be arranged radially instead of axially on the connecting part 14A.

The essential difference between the embodiment of FIG. 3 and the embodiment of FIG. 2 consists in the fact that the piston 16A is inserted in a cylindrical region of the connecting part 14A and is sealed against the inner wall of the connecting part 14A by means of a sealing ring 26 or the like. The lower abutment disc 18A is used for holding the piston 16A in an axially immovable manner. This abutment disc is configured as a perforated disc and has a sufficiently large diameter for its end region to be clamped between the bearing surface 11 and the opposite bearing surface 15A.

The rim region of the lower abutment disc 18A can be coated with an elastomer material for better sealing against the bearing surfaces 11A and 15A.

Figure 4:
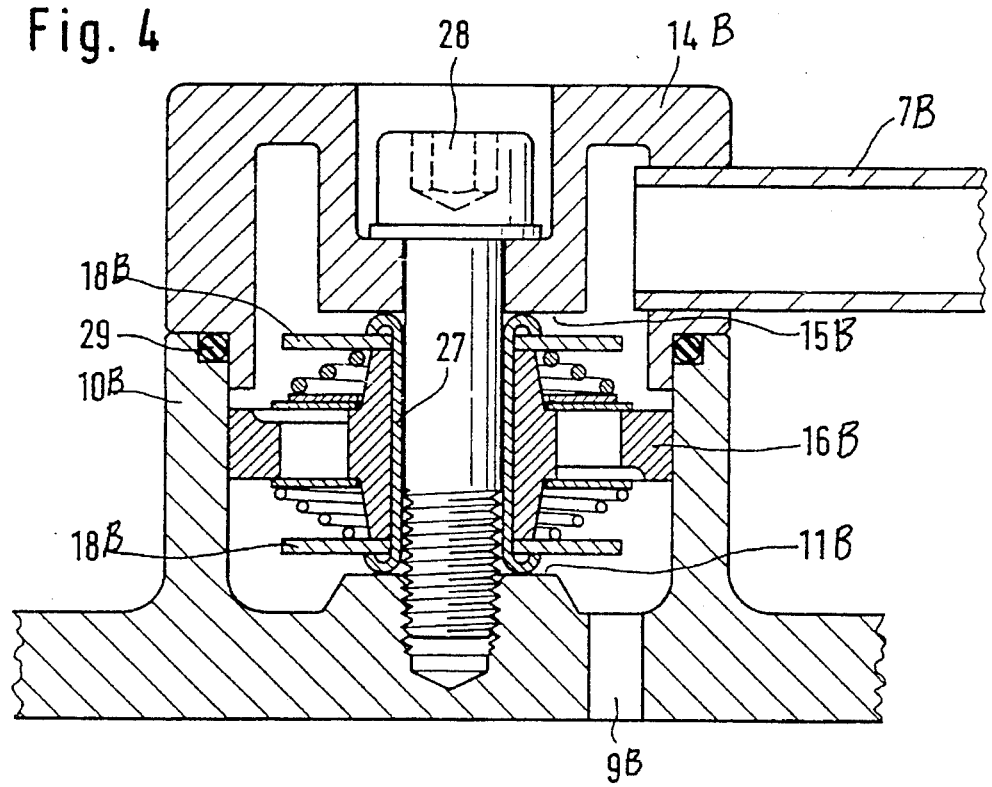

In FIG. 4, corresponding drawing reference numbers (with suffix "B") as used in FIG. 2 are used for similarly operating parts. Unless otherwise described below, the description of these parts for FIG. 2 can be assumed.

The embodiment of FIG. 4 provides for the connecting mouthpiece 10B to form a cylinder on the inside in which the piston 16B can be tightly inserted.

Furthermore, the piston 16B is connected to the abutment discs 18B only by means of a thin-walled hollow rivet 27 so that a fastening bolt 28 penetrating the hollow rivet 27 can be screwed into a threaded hole at the bottom of the connecting mouthpiece 10B. The cap type connecting part 14B can be held on the connecting mouthpiece 10B by means of this bolt 28 in the manner which can be seen from FIG. 4, the annular gap between the connecting mouthpiece 10B and the connecting part 14B being shut off by a seal 29.

The connecting part 14B is shaped in such a way that the ends of the hollow rivet 27 can be clamped between the bearing surface 11B at the bottom of the connecting mouthpiece 10B and the opposite bearing surface 15B at the bottom of the connecting part 14B, the piston 16B and the abutment discs 18B being simultaneously secured axially.

Figure 5:
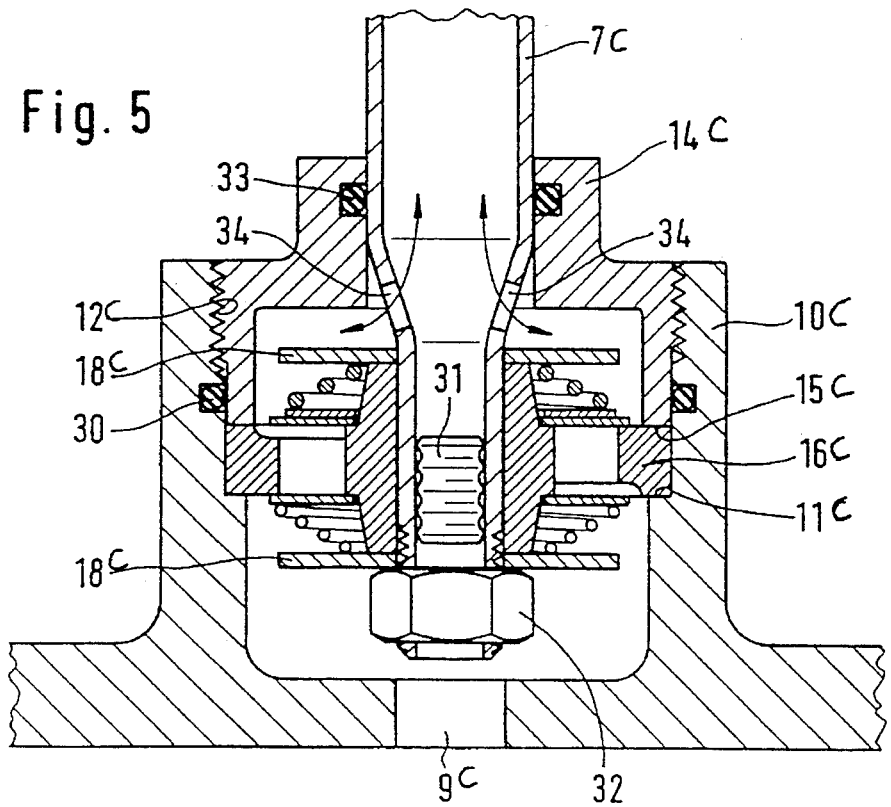

In FIG. 5, corresponding drawing reference numbers (with suffix "C") as used in FIG. 2 are used for similarly operating parts. Unless otherwise described below, the description of these parts for FIG. 2 can be assumed.

In the embodiment of FIG. 5, the connecting mouthpiece 10C again has an internal thread 12C above the annular bearing surface 11C and, in this embodiment, the connecting part 14C, which is provided with an external thread, can be screwed into the internal thread 12C in such a way that the piston 16C can be clamped axially between the bearing surface 11C of the connecting mouthpiece 10C and the lower rim of the connecting part 14C, which acts as the opposite bearing surface 15C. A seal 30 can be arranged between the connecting part 14C and the connecting mouthpiece 10C in order to seal the thread.

The conduit 7C has an end which is tapered down to fit into the central hole of the piston 16C. This end is closed by a plug 31 and has an external thread onto which a nut 32 can be screwed in order to hold the piston 16C and the abutment discs 18C onto the tapered-down end of the conduit 7C. In this way, therefore, the conduit 7C is connected to the piston 16C.

The connecting part 14C is rotatably supported on the conduit 7C and a seal 33 shuts off the annular gap between the outside of the conduit 7C and the inner wall of the tubular extension of the connecting part 14C, which surrounds the conduit 7C.

In the transition region to the end section closed by the plug 31, the conduit 7C has openings 34 by means of which the inner space of the conduit 7C communicates with the space above the piston 16C in the connecting part 14C.

So that the connecting part 14C can be grasped by an appropriate tool when being screwed into the thread 12C of the connecting mouthpiece 10C, the periphery of the region of the connecting part 14C surrounding the conduit 7C can be configured with two flats or have a hexagon or the like.

The piston 16C therefore has a double function in the embodiment of FIG. 5. On the one hand, it interacts with the valve plates 21C and 22C and the springs 23C and 24C as a damper valve. On the other hand, it acts as the holding element for the conduit 7C.

Figure 6:
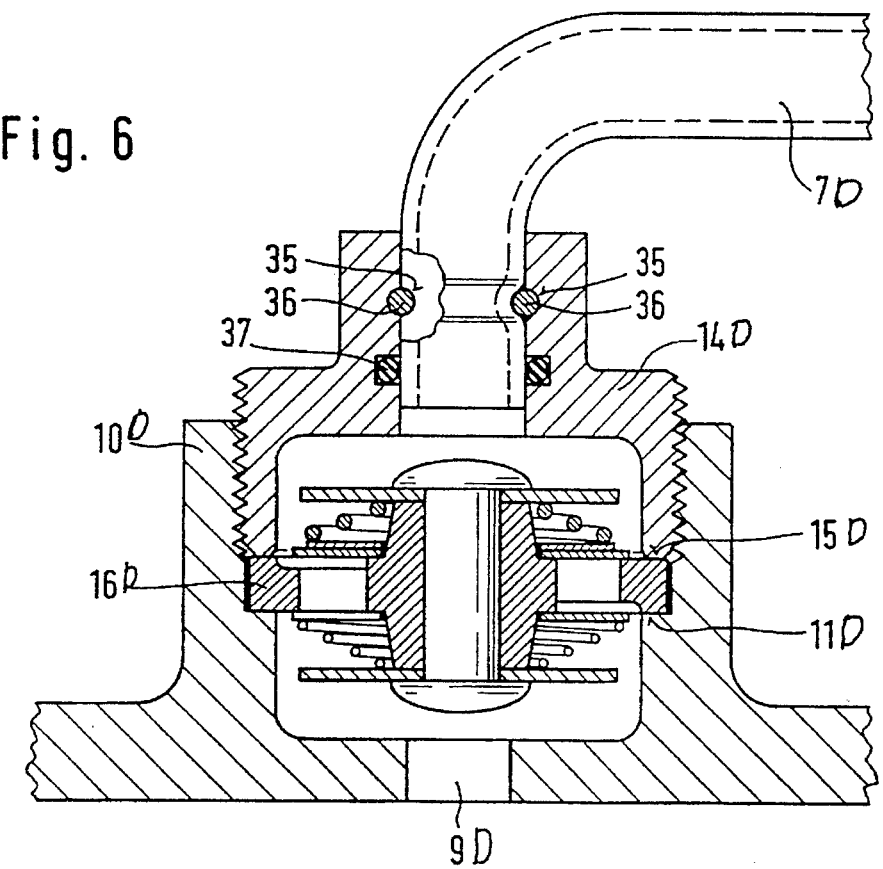

In FIG. 6, corresponding drawing reference numbers (with suffix "D") as used in FIG. 2 are used for similarly operating parts. Unless otherwise described below, the description of these parts for FIG. 2 can be assumed.

The embodiment of FIG. 6 largely resembles the embodiment of FIG. 2. The essential difference lies in the fact that the connecting part 14D is rotatably connected to the conduit 7D and can be screwed directly into the connecting mouthpiece 10D by means of an external thread in order to clamp the piston 16D between the bearing surface 11D and the opposite bearing surface 15D.

Two transverse holes 35, whose center lines are at a distance apart corresponding to the outer diameter of the conduit 7D, are arranged in the connecting part 14D and tangential to a hole accommodating the conduit 7D in order rotatably to connect the connecting part 14D and the conduit 7D. The transverse holes 35 and the hole in the connecting part 14D accommodating the conduit 7D correspondingly intersect. In the region of the transverse holes 35, the conduit 7D has a peripheral groove, which is formed without machining and is of such a type that pin-type arms of a circular wire clamp 36 can be inserted in the transverse holes 35 to restrain the conduit 7D positively in the axial direction on the connecting part 14. A sealing ring 37 is also provided for sealing between the conduit 7D and the connecting part 14D.

Figure 7:
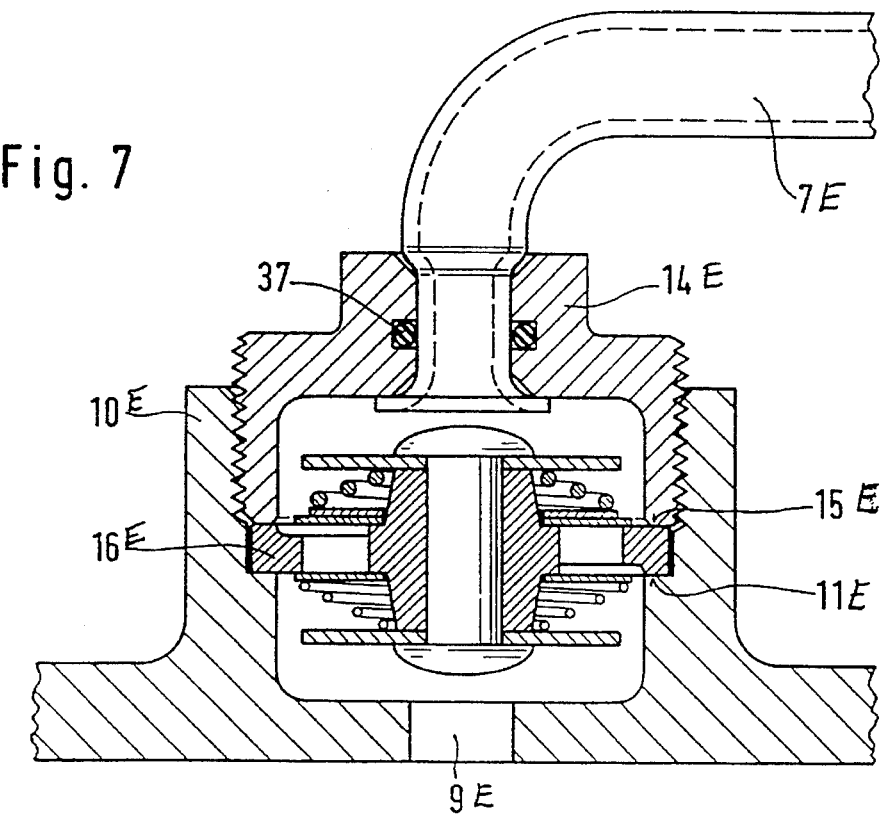

In FIG. 7, corresponding drawing reference numbers (with suffix "E") as used in FIG. 2 are used for similarly operating parts. Unless otherwise described below, the description of these parts for FIG. 2 can be assumed.

A rotatable arrangement of the connecting part 14E on the conduit 7E is again provided in the embodiment of FIG. 7. For retention purposes, the conduit 7E is beaded at its end on the inside of the connecting part 14E. The sealing between the connecting part 14E and the conduit 7E takes place by means of the sealing ring 37.

In the embodiments of FIGS. 2, 6 and 7, the sealing between the bearing surface 11e and the opposite bearing surface 15E, on the one hand, and the end rims of the piston 16E facing towards them, on the other, takes place by means of annular rims or the like on the piston 16E or on the surfaces 11E and 15E.

Instead of this, it is also contemplated according to other embodiments to coat the end rims of the piston 16E with an elastomer material or to configure them from a material which yields under high pressure, for example aluminum, so that the surfaces 11E and 15E can press into the end rims of the piston 16E facing towards them when the connecting part 14E is correspondingly firmly clamped axially against the piston 16E and the bearing surface 11E.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Hydraulically supported power steering system for motor vehicles comprising:

a double-acting hydraulic displacement unit for generating an auxiliary hydraulic force, said hydraulic displacement unit including displacement body working spaces acted on by a controllable hydraulic pressure by means of associated conduits controlled by a servo-valve, and damper valves configured as plate valves arranged on respective conduit connections of the associated conduits, wherein the damper valves include a perforated disc type of support part which can be clamped in the manner of a spacer ring between a bearing surface of a connecting mouthpiece arranged on a housing of one of the servo valve and the displacement unit and an opposite bearing surface of a connecting part of a respective conduit, said connecting part being detachably connected to the connecting mouthpiece.

2. Power steering system according to claim 1, wherein the support part is a disc-type piston with axial passages controlled by damper valve members, said piston dividing two chambers from one another within a space enclosed by the connecting mouthpiece and the connecting part, of which chambers one is connected to the respective conduit and one is connected to one of the servo-valve and one of said working spaces of the displacement unit.

3. Power steering system according to claim 2, wherein a rim of the piston is axially clamped between annular opposite bearing surfaces of the connecting mouthpiece and of the connecting part.

4. Power steering system according to claim 3, wherein the conduit is held on the piston.

5. Power steering system according to claim 2, wherein the conduit is held on the piston.

6. Power steering system according to claim 1, wherein said connecting part and connecting mouthpiece are connected by a threaded connection which also effects detachable clamping of said perforated disc type support part.

7. Power steering system according to claim 6, wherein said threaded connection is formed by interengaging threads on the connecting part and the connecting mouthpiece.

8. Hydraulically supported power steering system for motor vehicles comprising:

a double-acting hydraulic displacement unit for generating an auxiliary hydraulic force, said hydraulic displacement unit including displacement body working spaces acted on by a controllable hydraulic pressure by means of associated conduits controlled by a servo-valve, and damper valves arranged on respective conduit connections of the associated conduits, wherein the damper valves include a disc-type piston with axial passages controlled by damper valve members, said piston dividing two chambers from one another within a space enclosed by a connecting part of a respective conduit and a connecting mouthpiece arranged on a housing of one of the servo valve and the displacement unit, of which chambers one is connected to the respective conduit and one is connected to one of the servo-valve and one of said working spaces of the displacement unit, said connecting part being detachably connected to the connecting mouthpiece, wherein the piston is insertable axially in a cylindrical section of one of the connecting mouthpiece and the connecting part and axially adjoins a perforated disc, a rim of the perforated disc being axially clamped between an annular bearing surface of the connecting mouthpiece and an opposite bearing surface of the connecting part.

9. Power steering system according to claim 8, wherein the damper valves are configured as plate valves.

10. Hydraulically supported power steering system for motor vehicles comprising:

a double-acting hydraulic displacement unit for generating an auxiliary hydraulic force, said hydraulic displacement unit including displacement body working spaces acted on by a controllable hydraulic pressure by means of associated conduits controlled by a servo-valve, and damper valves arranged on respective conduit connections of the associated conduits, wherein the damper valves include a disc-type piston with axial passages controlled by damper valve members, said piston dividing two chambers from one another within a space enclosed by a connecting part of a respective conduit and a connecting mouthpiece arranged on a housing of one of the servo valve and the displacement unit, of which chambers one is connected to the respective conduit and one is connected to one of the servo-valve and one of said working spaces of the displacement unit, said connecting part being detachably connected to the connecting mouthpiece, and wherein the piston is insertable axially into a cylindrical section of one of the connecting mouthpiece and the connecting part and has a central opening through which can be pushed a bolt, said central opening having a central opening axis, which bolt penetrates a hole on the connecting part and extends on the central opening axis and can be screwed into a threaded hole in the connecting mouthpiece and on the same axis as the connecting part, the piston being clamped in the manner of a spacing ring between a bearing surface of the connecting mouthpiece and an opposite bearing surface of the connecting part.

11. Power steering system according to claim 10, wherein the bearing surface and the opposite bearing surface are arranged on the threaded hole of the connecting mouthpiece and on the hole in the connecting part accommodating the bolt and respectively interact with a central region of the piston or parts connected to it.

12. Power steering system according to claim 11, wherein the conduit is held on the piston.

13. Power steering system according to claim 10, wherein the damper valves are configured as plate valves.

14. Power steering system according to claim 10, wherein said piston is supported by a hollow rivet which forms said spacing ring.

15. Hydraulically supported power steering system for motor vehicles comprising:

a double-acting hydraulic displacement unit for generating an auxiliary hydraulic force, said hydraulic displacement unit including displacement body working spaces acted on by a controllable hydraulic pressure by means of associated conduits controlled by a servo-valve, and damper valves arranged on respective conduit connections of the associated conduits, wherein the damper valves include a perforated disc type of support part which can be clamped in the manner of a spacer ring between a bearing surface of a connecting mouthpiece arranged on a housing of one of the servo valve and the displacement unit and an opposite bearing surface of a connecting part of a respective conduit, said connecting part being detachably connected to the connecting mouthpiece, and wherein the support part is a disc-type piston, and wherein the conduit is held on the piston.

16. Power steering system according to claim 15, wherein the damper valves are configured as plate valves.

17. Hydraulically supported power steering system for motor vehicles comprising:

a double-acting hydraulic displacement unit for generating an auxiliary hydraulic force, said hydraulic displacement unit including displacement body working spaces acted on by a controllable hydraulic pressure by means of associated conduits controlled by servo-valve, and damper valves arranged on respective conduit connections of the associated conduits, wherein the damper valves include a perforated disc type of support part which can be clamped in the manner of a spacer ring between a bearing surface of a connecting mouthpiece arranged on a housing of one of the servo valve and the displacement unit and an opposite bearing surface of a connecting part of a respective conduit, said connecting part being detachably connected to the connecting mouthpiece by a threaded connection which also effects detachable clamping of said perforated disc type support part, and wherein said threaded connection is formed by threads on one of said connecting part and connecting mouthpiece and threads on a connecting member separate from the connecting part and connecting mouthpiece.

18. Power steering system according to claim 17, wherein the damper valves are configured as plate valves.

* * * * *